UNITED STATES PATENT OFFICE.

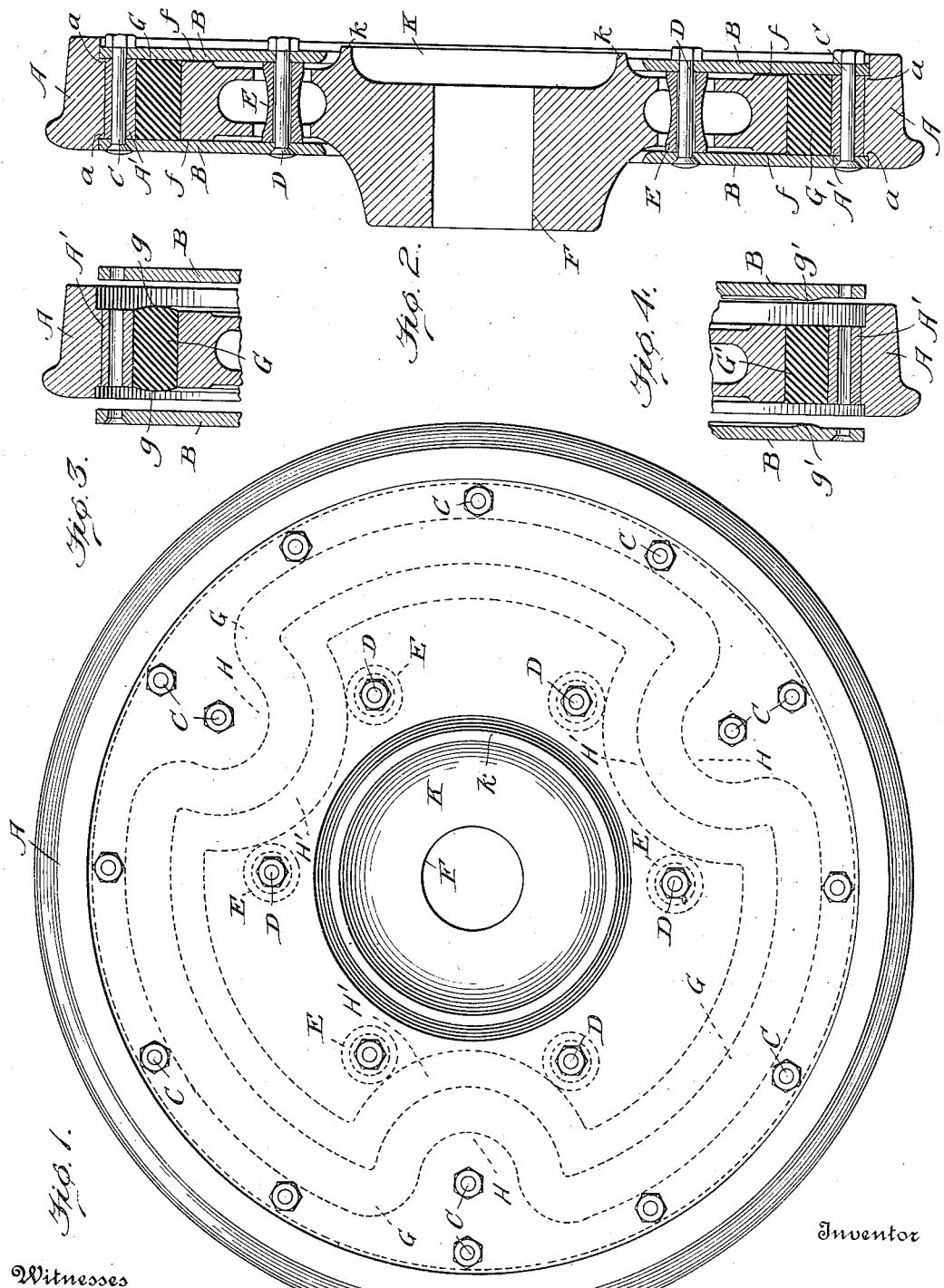

EDWIN C. MADDEN, OF NEW YORK, N. Y.

WHEEL.

1,183,475.  Specification of Letters Patent.  Patented May 16, 1916.

Application filed December 29, 1914. Serial No. 879,449.

*To all whom it may concern:*

Be it known that I, EDWIN C. MADDEN, a citizen of the United States, residing at New York, in the county and State of New York, have invented certain new and useful Improvements in Wheels; and I do hereby declare the following to be a full, clear, and exact description of the same, reference being had to the accompanying drawings, forming part of this specification, and to the figures and letters of reference marked thereon.

The present invention relates to improvements in vehicle wheels, and particularly to wheels for use on railway cars of all kinds, where it is desired to reduce or eliminate as far as possible the noise incident to the operation of the wheels in the progress of the vehicle over the track, and also by reason of a cushioned tread reduce wheel pressure, improve resistance to wear and tear in the wheel itself, in the rolling stock, rail and road bed.

The invention is designed as an improvement upon the structure set forth in my prior Patents Nos. 783,294, dated February 21, 1905, and 1,122,620, dated December 29, 1914, the object of the invention being to simplify and improve the construction of the wheel whereby its application and adaptability to all kinds of traffic, but especially street railway traffic, will be simplified and improved, and the wheel generally in all service rendered more efficient for sound deadening purposes, reducing wheel pressure, resisting wear and tear on the wheel itself and upon the road bed and rails, and for the prolongation of the life of the rolling stock in which the wheels are employed, whereby the wheel will have a greater range of usefulness for railway cars designed for widely different kinds of service.

The wheel embodies in its construction a rim and tread part, the peripheral contour of which is of the well known flange form designed for traveling upon rails, and may of course be modified in accordance with approved practice. This rim is provided upon its inner face with a series of curved inwardly extending projections preferably three in number, as in the patents heretofore referred to, and between said projections the inner face of the rim is of segmental form, constituting broad and relatively long bearing faces for the cushion of specially treated rubber compound, or other non-resonant or sound deadening material which is adapted to seat against the inner face of the rim throughout its entire area. The cushion is made to conform accurately to the contour of the inner face of the rim and to extend around the projections hereinbefore referred to. The non-resonant and sound deadening material of the cushion forms as it were a lining or gasket within the rim, and an irregularly shaped cavity or chamber within which will fit a correspondingly shaped hub or center section. The center or hub section receives the axle of the vehicle and its periphery corresponds in shape to the inner face of the rim whereby the non-resonant sound deadening material is confined between broad flat surfaces, and while preventing the transmission of sound vibrations from the tire section or rim to the hub and to the other sound conducting materials of which the truck frames are constructed, it may be made sufficiently dense to give the desired rigidity to the wheel. Relatively angular movement of the rim and center or hub section, hereinafter called the inner wheel, is prevented by the large inwardly extending projections which interlock with the outwardly extending segmental sections of the center or hub section.

For keeping the rim section (or outer wheel) and the hub center section (or inner wheel) in exact position and for confining the non-resonant sound deadening material longitudinally of the axis of the wheel, the rim section is provided with side or face plates located on the inner and outer sides. Such face plates are interlocked and rigidly bolted with the rim at the outer edges and extend inwardly so as to embrace the non-resonant sound deadening material and the center section and close up to, but not in contact with the hub of the center section. The inner portions of the plates are rigidly connected, and at the same time are rigidly spaced and maintained in proper relative position by stay bolts or spacers provided with shoulders. These stay bolts pass through the center section, (or inner wheel) in openings of sufficient diameter to prevent contact between the bolts and the inner wheel, even should the non-resonant sound deadening material be irregularly compressed by the load or traffic conditions.

The side plates referred to are designed not only to hold the parts in accurate relation in respect to movement longitudinally of the axis and to give increased strength to the rim section of the wheel, but at the same time to provide for a limited radial and perpendicular movement of the parts with relation to each other when subjected to load or jolt or jar upon the track, or when the brakes are applied, or when the torsional stress of the motor is applied, or when there is any tendency to compress the cushion of non-resonant sound deadening material.

In the preferred construction, the inner or hub section is provided with comparatively narrow radial or side bearing faces at the outer edge to engage portions of the side plates; thus, all frictional resistance to the movement of the parts upon each other is confined to comparatively small areas, and the area through which the sound vibrations may be transmitted from the side plates to the inner section is correspondingly reduced.

In the accompanying drawings,—Figure 1 is a side elevation of a wheel embodying the present improvements; Fig. 2 is a section in a vertical plane longitudinally of the axis of the wheel shown in Fig. 1; Fig. 3 is a detail section showing the resilient cushion and side plates before the latter are clamped in position; and Fig. 4 is a detail section illustrating a modification of the arrangement shown in Fig. 3.

Like reference characters in the several figures indicate the same parts.

In the wheel illustrated in the drawings, and which is of the preferred construction, the outer wheel is composed of several members which are rigidly connected together and constitute in effect the rim section. These several members consist of a tire or tread member A preferably shrunken on an annular tread member support A' and side plates B adapted to be clamped to the sides of the tread member support by through bolts C and to project beyond said support A' and embrace a portion of the tread member A, which latter is provided with annular seats and shoulders $a$ for the peripheries of the side plates B, whereby the tread member will be firmly locked in position, in addition to the grip afforded by the shrinking of the same in place. The side plates B are rigidly connected at suitable points near their inner portions by through bolts D and are spaced apart and rigidly maintained by spacers E formed by shoulders on the bolts in the well known way, or preferably in the form of spools which surround the bolts and against the ends of which the plates are clamped by the bolts themselves.

For a reason which will presently appear, the inner wheel or hub member is in the present instance made of relatively large diameter as compared with the corresponding member of the structures shown in the patents hereinbefore referred to and the openings in the side plates B are correspondingly enlarged. This inner wheel or hub member is indicated generally by the letter F, and by reference to Fig. 2 it will be seen that it is provided near its periphery with relatively narrow side bearing surfaces $f$ adapted to make contact with or lie in immediate proximity to the inner faces of the side plates B, while interposed between the periphery of the inner wheel and inner face of the rim or tread support A' there is a non-resonant body or cushion member G which usually extends continuously around the parts, so as to form a resilient support for the inner wheel at every point.

As in the constructions of the previous patents, the present structure is provided with a plurality, preferably three, projections and recesses indicated by the dotted lines at H and H', Fig. 1, for locking the two parts of the wheel against relative angular movement and the cushion member G extends between the same, whereby the resilient or non-resonant effect of the cushion is preserved with the wheel in any and all positions on the track, and at the same time metallic contact between the parts is effectually prevented, even under extreme stresses due to driving or braking action transmitted through the axle or inner wheel to the rim section and track.

It is well understood that in the construction of wheels designed for street railway traffic it is necessary to construct the truck equipment in such wise that it will be practically completely covered in under the body of the car and in order to avoid contact with street obstructions which the body of the car will pass without contact, it is necessary to construct the wheel with a considerable "dish," so called, in order to allow sufficient space for the journal box, and so that the box itself will not project beyond the side lines of the car body. It is for this reason that practically all of the car wheels designed for surface cars are now made more or less dished, and this object is accomplished in the present structure without interfering with the non-resonant qualities by providing a relatively large inner wheel or hub section and dishing or forming a concavity in its outer face to provide a sufficient space for the reception of the journal box.

Referring to Fig. 2 of the drawings, it will be seen that the hub section F is provided on its outer face with a relatively large concavity K which extends well within the planes of the sides of the wheel, and the hub section is preferably correspondingly projected on the inner side of the wheel, so as to avoid any weakening effect due to the formation of the cavity. The periphery of the cavity is defined by an annular projection $k$ preferably extending beyond the plane of the front side plate B and the effect of the structure is similar to the effect produced by an inclination of the members of the wheel intermediate the axle or hub and rim, inasmuch as the front face of the inner wheel or hub section is brought into a transverse plane intermediate the sides of the rim and pressure exerted by the journal box downwardly upon the end of the axle extending through the hub, will be transmitted in a direct line at right angles to the axis to the rail lying under the rim.

With the large inner wheel or hub section it is found practical to dish the wheel in the manner described to a sufficient degree to accomplish the desired end without in any wise weakening the structure and without the necessity of providing inclined connecting parts between the hub and rim. Thus, any movement of the parts with relation to each other due to the employment of the cushion member is in a radial direction and does not bring metallic parts into contact with each other, nor cause lateral pressure thereon such as would be liable to create difficulties due to wear. At the same time, it becomes entirely practical to make use of castings of sufficient strength for the side plates. It will be understood, however, that it is not desired to limit the invention in the respect mentioned, inasmuch as it is only essential that the bearing surfaces $f$ should be radial or at right angles to the axis of the wheel, and that sufficient clearance should be provided between the inner portions of the side plates and the hub or inner wheel to permit of the desired relative lateral displacement when the cushion member is compressed to a greater or less degree under load or running stresses.

In wheels of the character described, it sometimes becomes an important desideratum that great rigidity should be provided, and in order to effect this and at the same time retain the non-resonant characteristics of the wheel due to the employment of a non-resonant cushion member between the inner wheel and rim section, provision is made whereby the non-resonant cushion member may be condensed in the space between the two metallic members of the wheel. The provision of such means is desirable inasmuch as practice shows that it is difficult to insert a non-resonant or cushioning member under sufficient pressure where the surfaces are substantially parallel. In the present construction it is preferred that the cushioning member should be made in longitudinal sections, three for example, two of which may be inserted and then by relative lateral pressure between the hub and rim sections the space for the other section is slightly widened and then the latter is inserted. In addition, provision is made whereby the side plates themselves will be employed as a means for condensing the cushion or non-resonant member in its chamber between the wheel and rim sections. This may be accomplished by providing the cushion member with rounded edges $g$, Fig. 3, against which rounded edges the side plates B will be clamped so as to compress said edges inwardly and thereby exert a pressure to the whole body or cushion which will increase its density and cause it to expand radially into all portions of its confining chamber. The same result may be accomplished by the employment of a cushion member G', Fig. 4, the edges of which are made to lie substantially flush with the faces of the inner and rim portions of the wheel, as shown in Fig. 4, in connection with annular projections $g'$ on the inner faces of the side plates B, which projections $g'$ will compress the edges of the cushion member so as to condense and expand the same radially just as in the structure shown in Fig. 3.

By the provision of an independent tire or tread member which may be made of steel or other material, first shrunken on the tread support and then locked by the side plates, it is obvious that a wheel structure is formed which, when worn may be turned or ground down, inasmuch as the tire or tread may be made of uniform structure throughout, and when finally worn to a point where its continued use is inadvisable, it may be readily removed and a new tire or tread section substituted without destroying the efficiency of the remaining portions of the wheel. It thus becomes possible to prolong the life of a wheel almost indefinitely by the substitution of tire or tread portions as required.

The wheel is designed to be non-rigid and deadened, on the principle of a wheel within a wheel, the function of the internal cushion of non-resonant material, interposed between the two wheels, and forming the tread for the inner wheel, being on the one hand to absorb and prevent the transmission of sound vibrations, produced by contact with the rail, to the car body, trucks and atmosphere; and on the other hand by reason of a cushioned tread absorb to a large extent the shocks due to the pounding on the rail, and the vibrations due to the grinding of the flange on the rail, both so objectionable to travel, and so destructive to the running gear and body of the car; thus the car practically rides on a rubber rail which will materially prolong the life of the road bed, the gear and body of the car, as well as of the wheel itself.

What is claimed is:

1. A wheel for preventing the transmission of vibrations, embodying a rim section having inwardly extending side plates on opposite sides of and rigid therewith, an inner wheel or hub section having a peripheral contour substantially conforming to the contour of the inner face of the rim section and spaced therefrom, said inner wheel having a dished outer face concentric with the axis whereby the journal box may be located in a plane transverse to the axis and within the sides of the rim section, and non-resonant material confined in the space between the rim and inner wheel sections.

2. A wheel for preventing the transmission of vibrations embodying a rim section having perpendicular inwardly extending side plates on opposite sides of and rigid therewith, said plates having radial bearing faces on the inside, an inner wheel or hub section having a peripheral contour substantially conforming to the contour of the inner face of the rim section and spaced therefrom and narrow radial side bearing faces coöperating with the radial faces on the plates, the central portion of the said inner wheel having a relatively large concavity in its outer face with its front face at the center in a plane transverse of the axis and lying between the sides of the rim section and non-resonant material confined in the space between the rim and inner wheel sections.

3. A wheel for preventing the transmission of vibrations embodying a rim section having perpendicular inwardly extending side plates on opposite sides of and rigid therewith, an inner wheel or hub section having a peripheral contour conforming to the inner face of the rim section and spaced therefrom, said inner wheel having a relatively large concavity in its outer face with its front face at the center in a plane transverse of the axis and lying between the sides of the rim section, an annular projection extending beyond the side plate on the front side of the wheel and a hub projection extending beyond the plate on the inner side of the wheel, and non-resonant material confined in the space between the rim and inner wheel sections.

4. A wheel for preventing the transmission of vibrations, embodying a rim section having perpendicular inwardly extending side plates on opposite sides of and rigid therewith, an inner wheel or hub section having a peripheral contour substantially conforming to the contour of the inner face of the rim section and spaced therefrom, said inner wheel having a relatively large concavity in its outer face whereby the journal box may be located in a plane transverse to the axis and within the sides of the rim section, and non-resonant material confined in the space between the rim and inner wheel sections.

EDWIN C. MADDEN.

Witnesses:
RUSSELL S. MADDEN,
E. T. ROCHE.